(12) United States Patent
Lu et al.

(10) Patent No.: US 12,120,038 B2
(45) Date of Patent: Oct. 15, 2024

(54) SWITCH AND SCHEDULING METHOD FOR PACKET FORWARDING OF THE SAME

(71) Applicant: REALTEK SEMICONDUCTOR CORP., Hsinchu (TW)

(72) Inventors: Kuo-Cheng Lu, Hsinchu (TW);
Yung-Chang Lin, Hsinchu (TW);
Yu-Mei Pan, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 450 days.

(21) Appl. No.: 17/412,504

(22) Filed: Aug. 26, 2021

(65) Prior Publication Data
US 2022/0070109 A1    Mar. 3, 2022

(30) Foreign Application Priority Data

Aug. 27, 2020 (TW) .................................. 109129263

(51) Int. Cl.
*H04L 47/6275* (2022.01)
*H04L 47/62* (2022.01)
*H04L 49/90* (2022.01)

(52) U.S. Cl.
CPC ........ *H04L 47/6275* (2013.01); *H04L 47/622* (2013.01); *H04L 49/90* (2013.01)

(58) Field of Classification Search
CPC .... H04L 47/6275; H04L 47/622; H04L 49/90
See application file for complete search history.

(56) References Cited

U.S. PATENT DOCUMENTS

| | | | | |
|---|---|---|---|---|
| 2004/0233912 A1* | 11/2004 | Droz | ................... | H04L 47/2416 370/395.21 |
| 2014/0219287 A1* | 8/2014 | Birke | ................... | H04L 47/621 370/412 |

FOREIGN PATENT DOCUMENTS

| | | |
|---|---|---|
| CN | 102201988 A | 9/2011 |
| CN | 104717160 A | 6/2015 |
| CN | 104852863 A | 8/2015 |
| WO | WO 2017000872 A1 | 1/2017 |

OTHER PUBLICATIONS

China Patent Office, Office Action issued on Jun. 18, 2024 for CN application No. 202010909225.4. Claim 1 is unpatentable over CN104717160A.

* cited by examiner

*Primary Examiner* — Siming Liu
(74) *Attorney, Agent, or Firm* — Li & Cai Intellectual Property (USA) Office

(57) ABSTRACT

A switch and a scheduling method for packet forwarding of the same are provided. The switch includes a plurality of absorb queues, a plurality of egress ports, and an absorb scheduler. Each of the egress ports includes a plurality of egress queues that are respectively connected to one of the absorb queues that are different from one another. The scheduling method includes: generating a priority state for each of the egress queues of each of the egress ports; a packet forwarding priority state of each of the absorb queues is determined according to the priority state of each of the egress queues connected thereto; and the absorb scheduler selecting one of the absorb queues to send a packet stored therein to a target egress queue of a target egress port to be sent to, according to the priority state of each of the egress queues.

16 Claims, 11 Drawing Sheets

SWITCH AND SCHEDULING METHOD FOR PACKET FORWARDING OF THE SAME

CROSS-REFERENCE TO RELATED PATENT APPLICATION

This application claims the benefit of priority to Taiwan Patent Application No. 109129263, filed on Aug. 27, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a scheduling method, and more particularly to a switch and a scheduling method for packet forwarding of the same.

BACKGROUND OF THE DISCLOSURE

A switch includes a plurality of egress ports, each of which includes a plurality of egress queues, such that transmission sequences of different data streams can be differentiated when the switch is forwarding (i.e., sending) a packet. Each of the egress queues are used to store packets with different priorities, respectively, and are configured with different egress queue weights to determine transmission ratios of the packets with different priorities, respectively. That is to say, the egress ports can determine which of the egress queues is selected for transmitting the packets, and determine an amount of the packets to be captured and transmitted from the selected one of the egress queues according to the egress queue weights, through a scheduler.

As shown in FIG. 1, an egress port P0 includes two egress queues Q0 and Q1, which are used to store packets having priorities of S1 and S2. When an egress queue weight of the two egress queues Q0 and Q1 of the egress port P0 are respectively 1 and 2, i.e., {Q0:Q1}=1:2, a scheduler 10 of the egress port P0 decides to capture and transmit one of the packets having the S1 priority of the egress queue Q0 of the egress port P0, and capture and transmit two of the packets having the S2 priority of the egress queue Q1 of the egress port P0. When the scheduler of the egress port decides to capture the packets of the selected egress queue and encounters that the egress queue has no packets to send, the scheduler then captures and transmits the packets of the next egress queue, thereby causing the egress queue weight to be unbalanced.

In addition, the packets can be forwarded through unicast, multicast, and broadcast. Unicast indicates that a packet can only be sent to one egress queue and one egress port, and multicast and broadcast indicate that a packet can be sent to a plurality of egress queues and a plurality of egress ports. In terms of a high bandwidth switch, the high bandwidth switch usually adopts a centralized memory framework, so as to be jointly used by each of the egress queues, thereby saving memory space for storing the packets to be forwarded; however, the framework is limited by the bandwidth of the memory. Therefore, for multicast/broadcast packets, a switch can only send the multicast/broadcast packets to the egress queues of the egress ports that are required to be sent to after being sent multiple times. In order to compensate the lack of operation efficiency, the multicast/broadcast packets can be stored in a central absorb memory through switch designs. Moreover, the central absorb memory can include a plurality of absorb queues and an absorb scheduler according to the egress queue weights of the egress queues.

Each of the absorb queues is used to store packets having different priorities, and each of the absorb queues is configured with different absorb queue weights, so as to determine a transmission ratio of the packets having different priorities. Generally speaking, the absorb queues and the egress queues have a corresponding relation, such that the packets can be sent from the absorb queues to the corresponding egress queues, and that the absorb scheduler can send the packets in the absorb queues to the egress queues of the egress ports to which the packets are required to be sent, according to the absorb queue weights. As shown in FIG. 2, an absorb queue AQ0 is connected to egress queues Q0 of egress ports P0, P1, and P2, respectively, and an absorb queue AQ1 is connected to egress queues Q1 of egress ports P0, P1, and P2. Two packets are stored in each of the absorb queues AQ0, a first one of the two packets is to be sent to the egress queues Q0 of the egress ports P0 and P1, respectively, and a second one of the two packets is to be sent to the egress queues Q0 of the egress ports P0 and P2, respectively. In addition, another two packets are also stored in the absorb queue AQ1, both of the another two packets are to be sent to the egress queues Q0 of the egress ports P0, P1, and P2, respectively. For ease of illustration in the following, FIG. 2 shows a manner of storage of the packets and the another packets in the absorb queues AQ0 and AQ1 after being sent to the egress queues of the egress ports through the absorb scheduler 13.

The absorb scheduler 13 can arrange proper absorb queue weights for the absorb queues AQ0 and AQ1, respectively. As shown in FIG. 3A, when the packets that are to be sent to the egress port P0 are stored in the absorb queues AQ0 and AQ1, and the egress queues Q0 and Q1 of the egress port P0 have egress queue weights that are 1 and 8, respectively, the absorb scheduler 13 can arrange the absorb queue weights of the absorb queues AQ0 and AQ1 to be 1 and 8, respectively, i.e., {AQ0:AQ1}=1:8. Similarly, as shown in FIG. 3B, when the packets that are to be sent to the egress port P1 are stored in the absorb queues AQ0 and AQ1, and the egress queues Q0 and Q1 of the egress port P1 have egress queue weights that are 8 and 1, respectively, the absorb scheduler 13 can arrange the absorb queue weights of the absorb queues AQ0 and AQ1 to be 8 and 1, respectively, i.e., {AQ0:AQ1}=8:1.

In addition, as shown in FIG. 3C, when the packets that are to be sent to the egress ports P1 and P2 are stored in the absorb queues AQ0 and AQ1, and the egress queues Q0 and Q1 of the egress port P2 have egress queue weights that are 4 and 1, respectively, the absorb scheduler 13 can calculate an average of the egress queue weight of the egress queues Q0 of the egress port P1 and the egress queue weight of the egress queues Q0 of the egress port P2, such that the average can be configured as the absorb queue weight of the absorb queue AQ0, and calculate another average of the egress queue weight of the egress queues Q1 of the egress port P1 and the egress queue weight of the egress queues Q1 of the egress port P2, such that the average can be configured as the absorb queue weight of the absorb queue AQ1, i.e., {AQ0:AQ1}={(8+4)/2:(1+1)/2}=6:1. That is to say, when a plurality of egress ports are served by the absorb scheduler 13, and the egress ports have identical egress queue weights, the absorb queue weights of the absorb queues AQ0 and AQ1 can have a simple configuration. However, when the egress ports served by the absorb scheduler 13 are configured with egress queue weights that are greatly disparate from one another, the absorb scheduler 13 is unable to arrange proper absorb queue weights.

As shown in FIG. 3D, since {Q0:Q1} of the egress port P0 and {Q0:Q1} of the egress port P1 are averaged 1:1, i.e., {AQ0:AQ1}={(1+8)/2:(8+1)/2}=1:1, such that the packets to be sent to the egress ports P0 and P1 stored in the absorb queues AQ0 and AQ1 are sent at a ratio of 1:1. However, the scheduler 10 of the egress port P0 expects to send the packets of the egress queue Q0 and Q1 of the egress port P0 at a ratio of 1:8, so that the packets of the egress queue Q1 of the egress port P0 are sent more rapidly. Therefore, the egress queue Q1 of the egress port P0 can easily be empty with no packets to send, and when an egress queue is empty, the egress queue weights of the egress queues can be unbalanced. Therefore, designing a scheduling method to prevent the imbalance of the egress queue weights has become an important issue in the industry.

SUMMARY OF THE DISCLOSURE

In response to the above-referenced technical inadequacies, the present disclosure provides a scheduling method for packet forwarding and a switch.

In one aspect, the present disclosure provides a scheduling method for packet forwarding adapted to a switch, and the switch includes a plurality of absorb queues, a plurality of egress ports, and an absorb scheduler. Each of the egress ports includes a plurality of egress queues, and each of the egress queues is connected to one of the absorb queues that is different from one another. The scheduling method includes the following steps: generating a priority state for each of the egress queues of each of the egress ports, the priority states being used to reflect an imminence that the egress queues corresponding to the priority states are to have no packets to send; and selecting, by the absorb scheduler, one of the absorb queues to send a packet stored therein to a target egress queue of a target egress port to be sent to, according to the priority state of each of the egress queues.

In another aspect, the present disclosure provides a switch including a plurality of absorb queues, a plurality of egress ports, and an absorb scheduler. Each of the egress ports includes a plurality of egress queues, and each of the egress queues is connected to one of the absorb queues that is different from one another. The switch generates a priority state for each of the egress queues of each of the egress ports, and the priority states are used to reflect an imminence that the egress queues corresponding to the priority states are to have no packets to send. The absorb scheduler selects one of the absorb queues to send a packet stored therein to a target egress queue of a target egress port to be sent to, according to the priority state of each of the egress queues.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
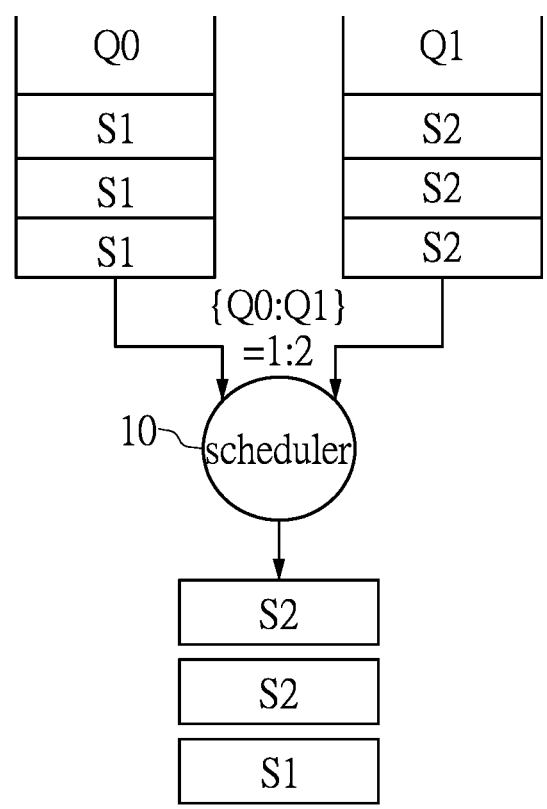
FIG. 1 is a schematic view showing an egress port determining a number of packets to be captured from an egress queue through use of a scheduler, according to an egress queue weight.
Figure 2:
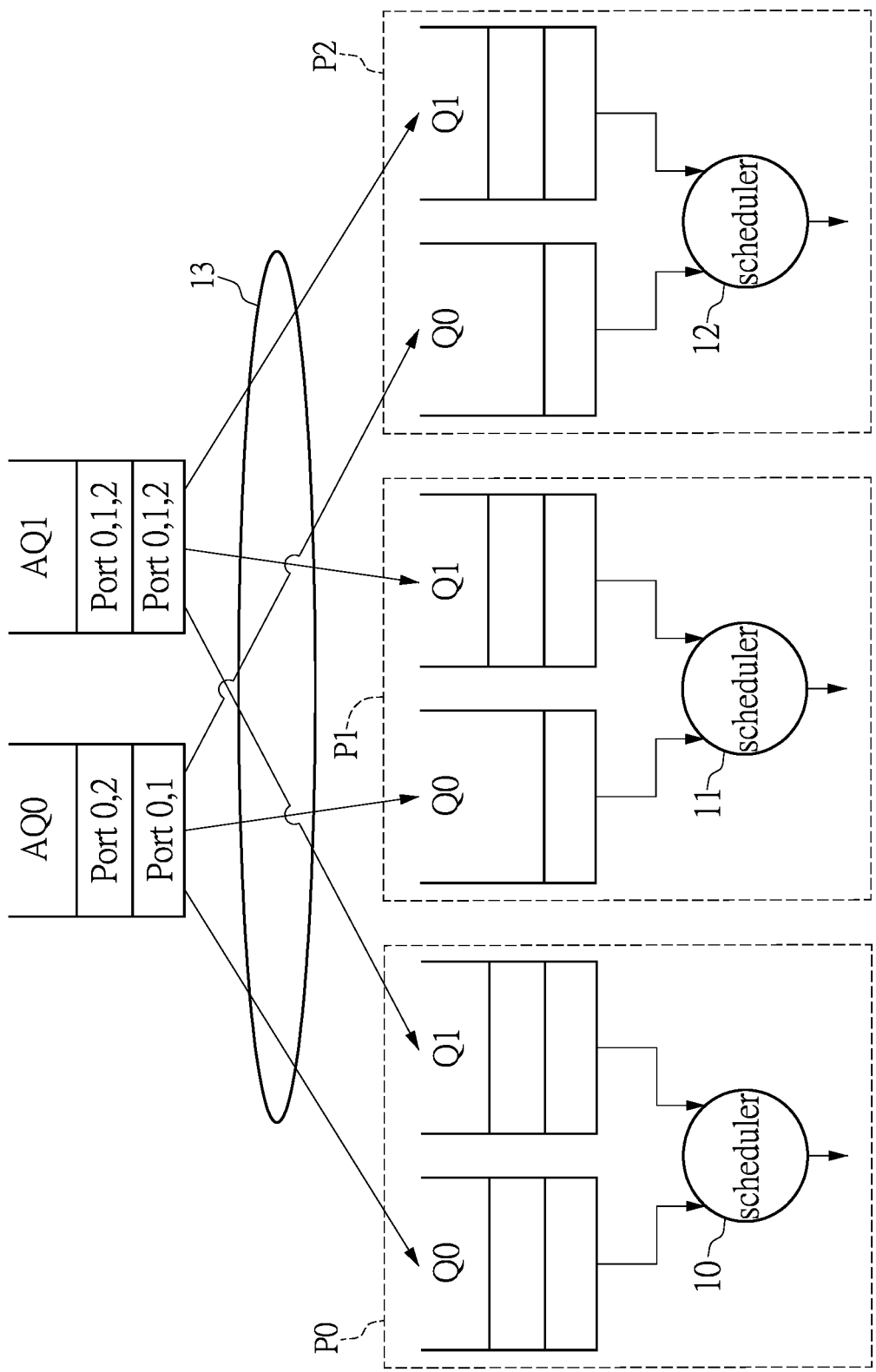
FIG. 2 is a schematic view showing packets in absorb queues being sent to the egress queues of the egress ports to which the packets are to be sent to, respectively, through conventional absorb schedulers.
Figure 3A:
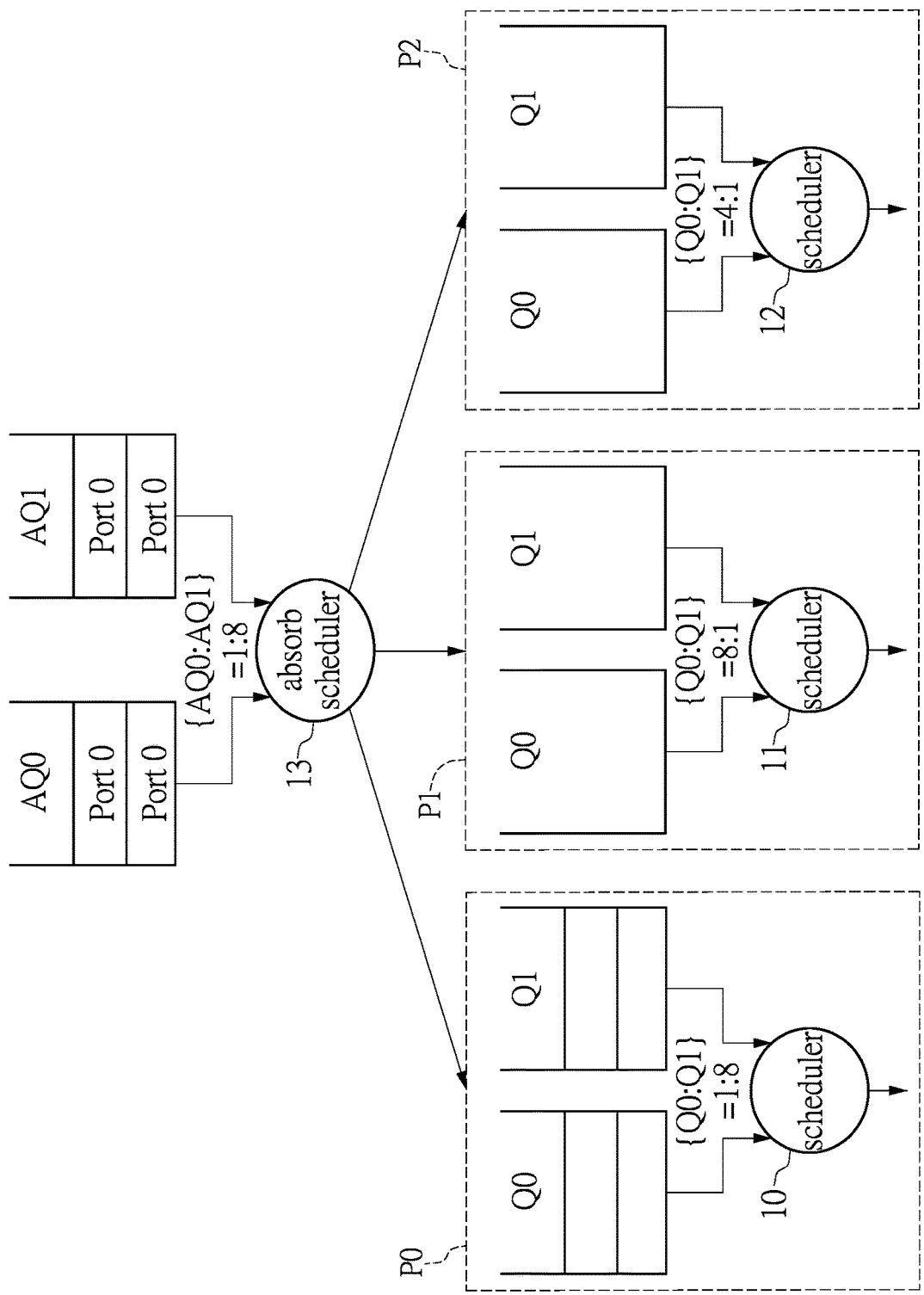
FIG. 3A to FIG. 3D are schematic views of the conventional absorb schedulers arranging the absorb queues with absorb queue weights, respectively.
Figure 3B:
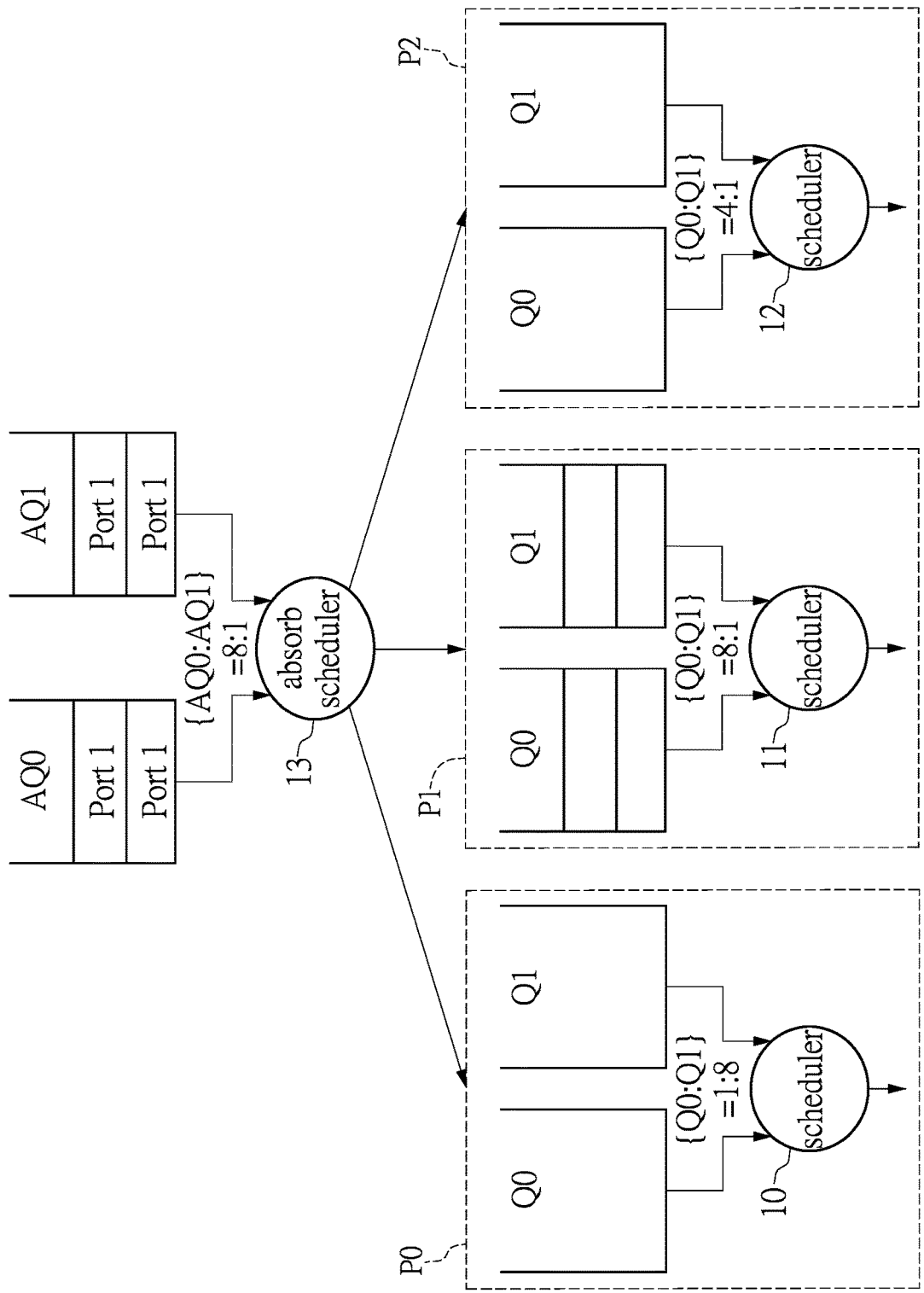
Figure 3C:
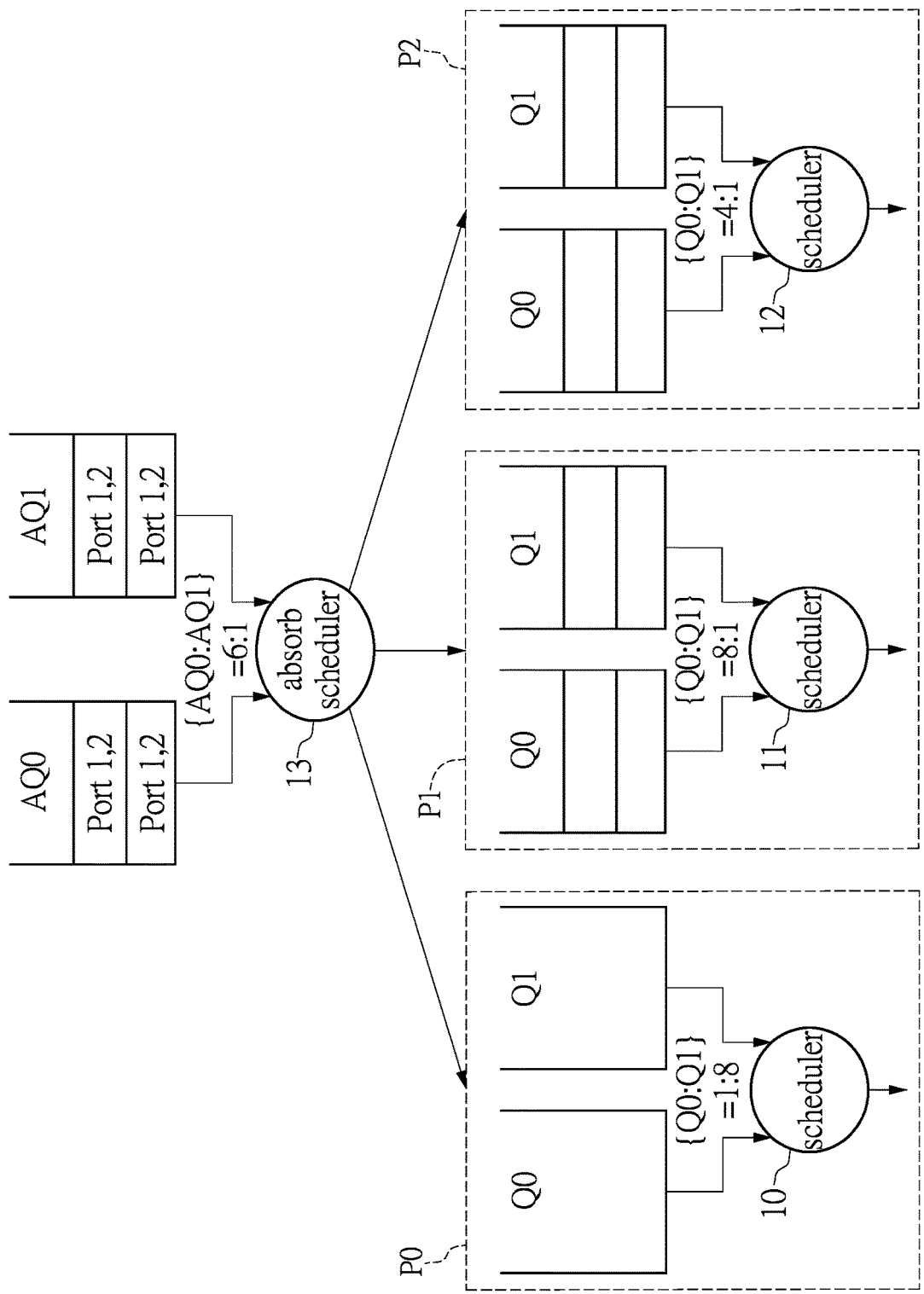
Figure 3D:
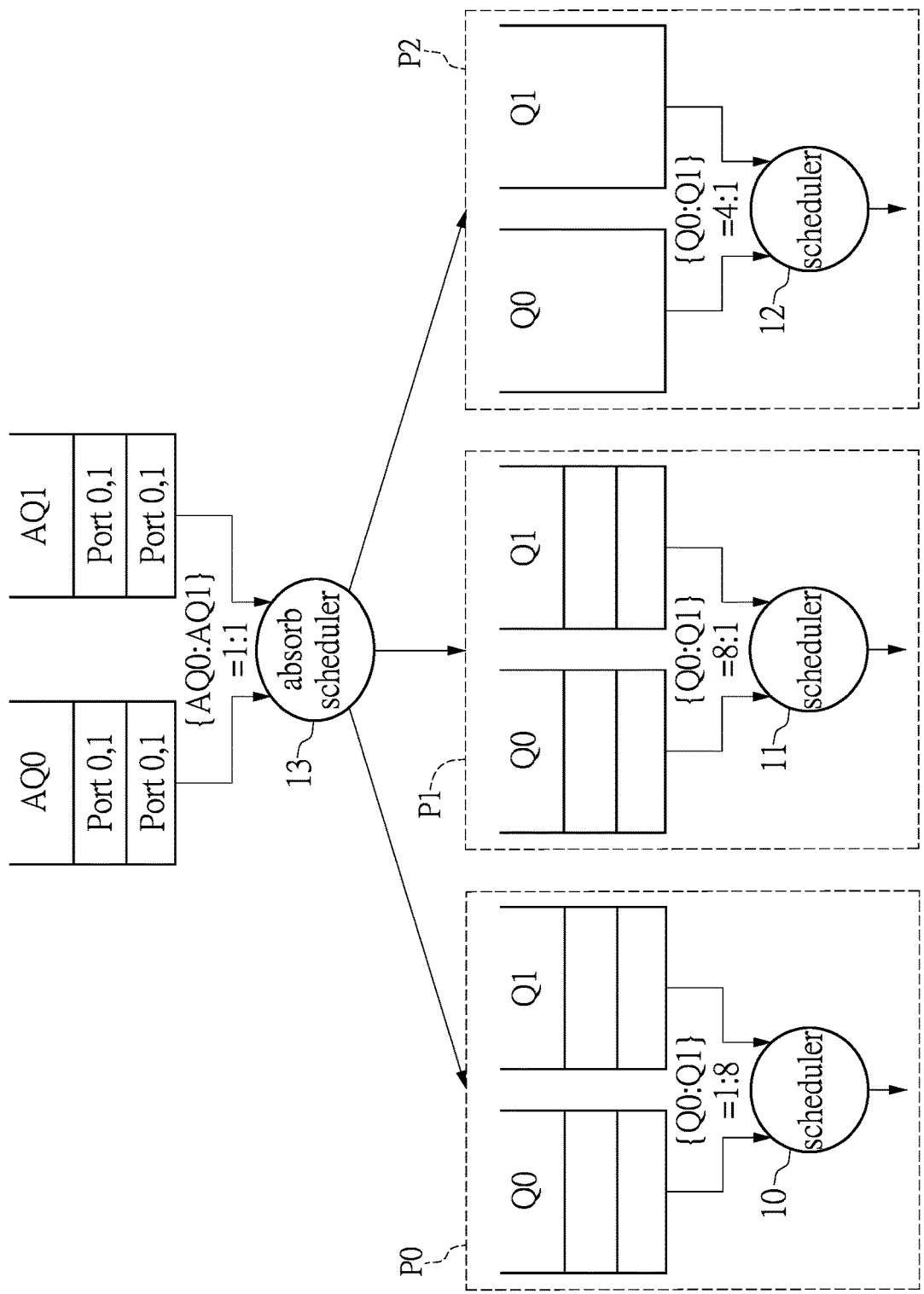

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 4:
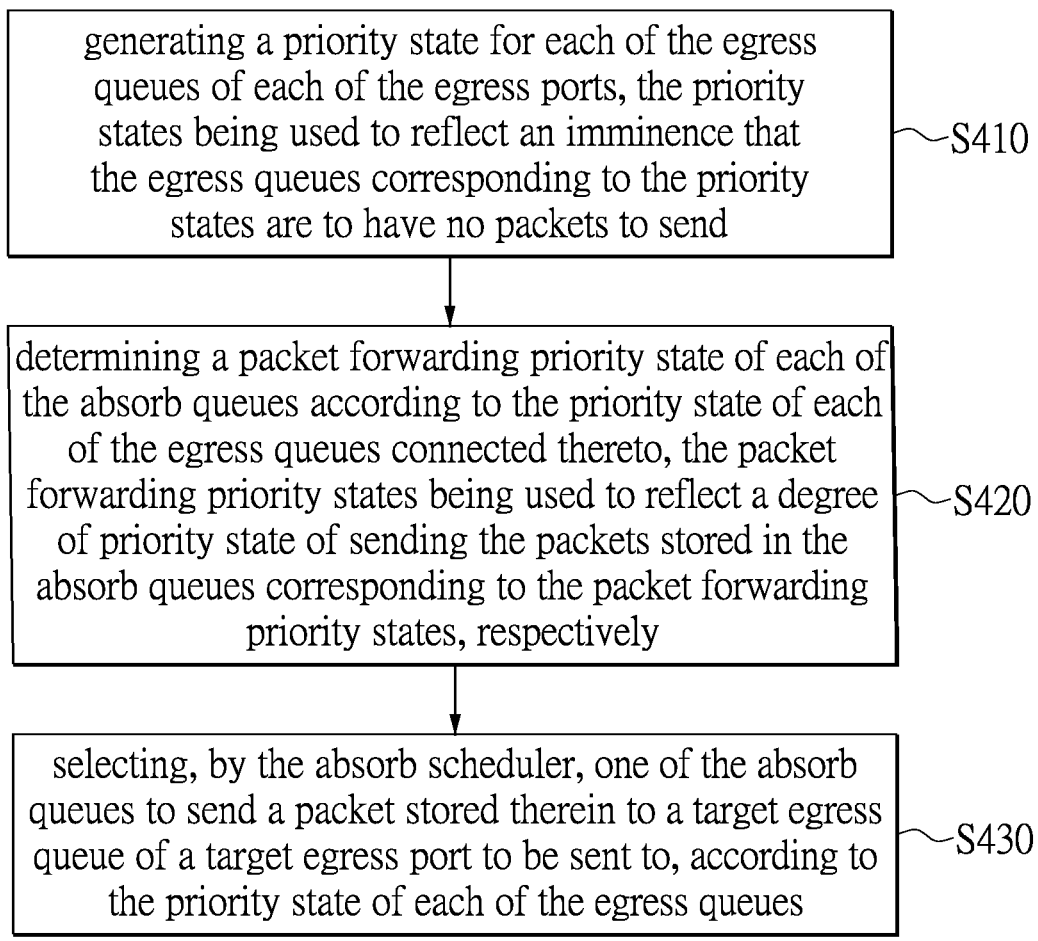
FIG. 4 is a flowchart of a scheduling method of the present disclosure.
Figure 5:
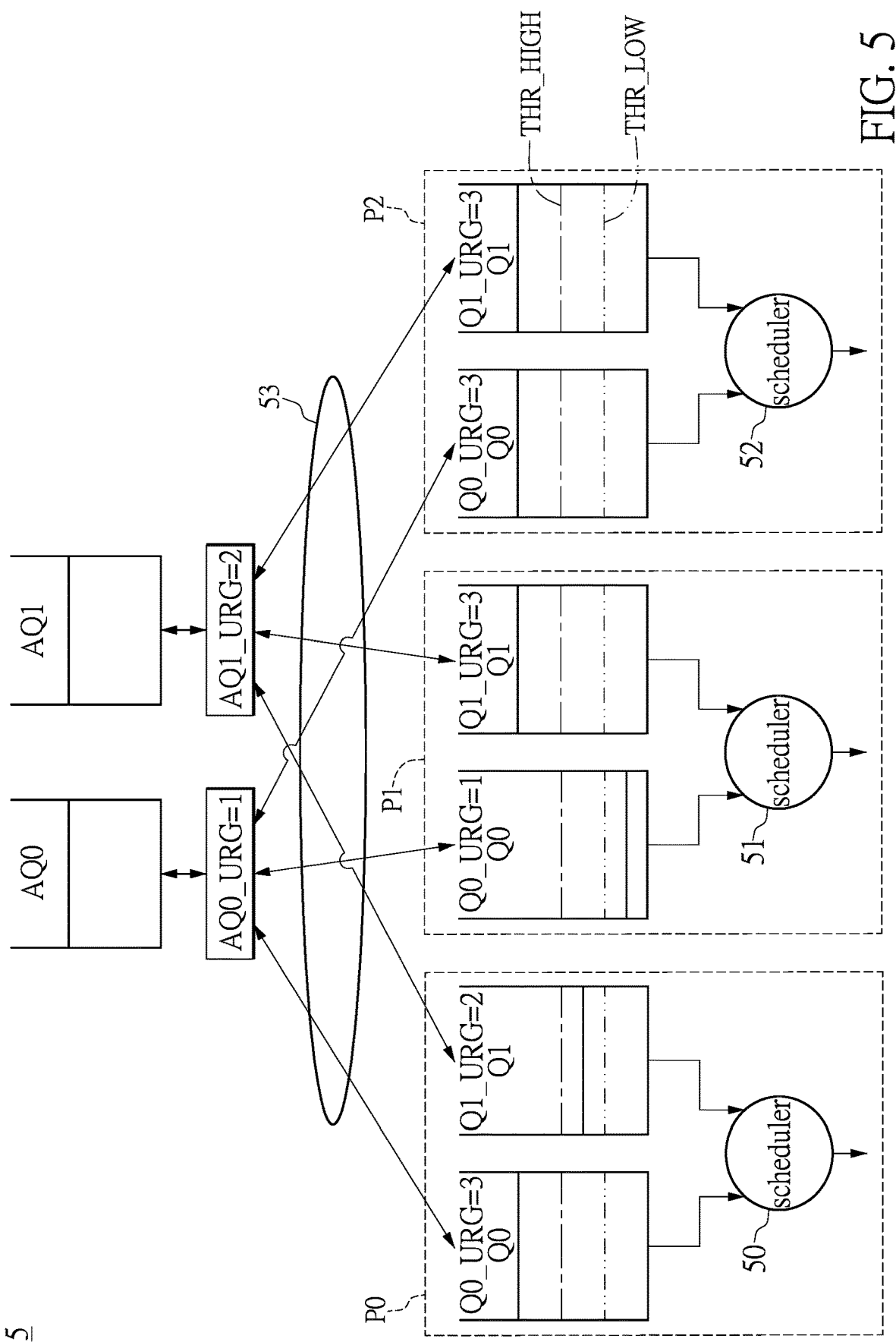
FIG. 5 is a first schematic view of a switch in one embodiment of the present disclosure using the scheduling method as shown in FIG. 4.

References are made to FIG. 4 and FIG. 5. FIG. 4 is a flowchart of a scheduling method of the present disclosure. FIG. 5 is a first schematic view of a switch in one embodiment of the present disclosure using the scheduling method as shown in FIG. 4. As shown in FIG. 5, a switch 5 can include a plurality of absorb queues, a plurality of egress ports, and an absorb scheduler 53. As mentioned above, each of the absorb queues is used to store packets having different priorities, each of the egress ports includes a plurality of egress queues, and each of the egress queues of each of the egress ports is connected to one of the absorb queues that is different from one another, such that each of the egress queues is also used to store the packets having different priorities.

For ease of illustration, only two of the absorb queues AQ0 and AQ1 and three of the egress ports are illustrated in FIG. 5, but the present disclosure is not limited thereto. Therefore, as shown in FIG. 5, each of the egress ports includes two egress queues Q0 and Q1, and each of the two egress queues Q0 and Q1 of each of the egress ports are connected to the absorb queues AQ0 and AQ1, respectively, such that the two egress queues Q0 and Q1 are used to store the packets having different priorities. In addition, the switch 5 can generate a priority state Qn_URG for each of the egress queues of each of the egress ports. As exemplified in FIG. 5, n is 0 or 1, and the priority states Qn_URG are used to reflect an imminence that the egress queues Qn corresponding to the priority states Qn_URG are to have no packets to send.

In practice, each of the egress queues can be arranged with a higher threshold value and a lower threshold value, i.e., a high threshold value THR_HIGH and a low threshold value THR_LOW. The switch 5 can regard a currently accumulated number of the packets in each of the egress queues as an amount of queue usage thereof, and the priority states Qn_URG are generated according to a result of a comparison between the number of the packets and the high threshold value THR_HIGH and the low threshold value THR_LOW. For example, when the currently accumulated number of the packets in the egress queue Q0 of the egress P1 is less than or equal to the low threshold value THR_LOW, the switch 5 can generate a priority state Q0_URG corresponding to the egress queue Q0 of the egress P1 that has a value of 1.

In addition, when the currently accumulated number of the packets in the egress queue Q1 of the egress P1 is greater than the low threshold value THR_LOW and less than the high threshold value THR_HIGH, the switch 5 can generate a priority state Q1_URG corresponding to the egress queue Q1 of the egress P1 that has a value of 2. Moreover, when the currently accumulated number of the packets in the egress queue Q0 of the egress P1 is greater than the high threshold value THR_HIGH, the switch 5 can generate the priority state Q0_URG corresponding to the egress queue Q1 of the egress P1 that has a value of 3, but the present disclosure is not limited thereto. In summary, in this embodiment, the priority state Qn_URG of each of the egress queues can be generated according to a result of a comparison between an amount of queue usage thereof and at least one threshold value, and it is assumed in this embodiment that the lower the value of the priority state Qn_URG indicates that the sooner the corresponding egress queue Qn is to have no packets to send.

On the other hand, when the currently accumulated number of the packets in each of the egress queues are identical to one another, the greater a flow rate of the egress queue Qn, the sooner the egress queue Qn is to have no packets to send. Therefore, in another embodiment, the priority state Qn_URG of each of the egress queues can also be generated according to a result of a comparison between the amount of queue usage thereof and the flow rate thereof. That is to say, as long as the priority state Qn_URG is determined according to the amount of queue usage, it can conform to the technical spirit of the present disclosure. Similarly, the switch 5 having the number of packets serve as the amount of queue usage is only an example, and the present disclosure does not limit the specific implementation of the switch 5 in calculating the amount of queue usage. In another embodiment, the switch 5 can also use byte count as the amount of queue usage. That is to say, as long as the absorb scheduler 53 schedules the absorb queues according to the amount of queue usage of each of the egress queues, it can conform the technical spirit of the present disclosure. In other words, the absorb scheduler 53 can select one of the absorb queues to send the packets stored therein to a target egress queue of a target egress port that is required to be sent to, according to the priority state Qn_URG of each of the egress queues.

In this embodiment, each of the egress queues can return the priority state Qn_URG to one of the absorb queues AQn connected thereto. Afterwards, the switch 5 can determine a packet forwarding priority state AQn_URG of each of the absorb queues, according to the priority state Qn_URG of each of the egress queues connected thereto, and the forwarding packet priority states AQn_URG are used to reflect a degree of priority state of sending the packets stored in each of the absorb queues corresponding to the priority states AQn_URG. As exemplified in FIG. 5, the egress queues Q0 of the egress ports P0, P1, and P2 respectively returns the priority state Q0_URG having values of 3, 1, and 3 to the absorb queues AQ0 connected thereto, respectively, and the switch 5 can select the lowest priority state Q0_URG with the lowest value as the packet forwarding priority state AQ0_URG of the absorb queue AQ0, i.e., AQ0_URG=1. It should be noted that, the switch 5 selects the lowest priority state Q0_URG as the packet forwarding priority state AQ0_URG of the absorb queue AQ0, so as to reflect the degree of priority state of sending the packets stored in the absorb queues AQ0, but the present disclosure is not limited thereto.

Similarly, the egress queues Q1 of the egress ports P0, P1, and P2 respectively returns the priority state Q1_URG having values of 2, 3, and 3 to the absorb queues AQ1 connected thereto, respectively, and the switch 5 can select the lowest priority state Q1_URG with the lowest value as the packet forwarding priority state AQ1_URG of the absorb queue AQ1, i.e., AQ1_URG=2. Therefore, as for the packet forwarding priority state AQ0_URG that is 1, as shown in FIG. 5, and for the packet forwarding priority state AQ1_URG that is 2, the absorb scheduler 53 prioritizes and schedules the absorb queue AQ0 to send the packets stored therein to the egress queue Q0 of the egress port Pm that is required to be sent to. As exemplified in FIG. 5, m is 0, 1, or 2, and is determined by the egress ports which the packets are required to be sent to. In other words, the absorb scheduler 53 can determine the most urgent one of the absorb queues that needs to send the packets, according to the packet forwarding priority state AQn_URG of each of the absorb queues.

The present disclosure does not limit the specific implementation of the absorb scheduler 53, and for ease of illustration in the following, the absorb scheduler 53 in the figures are mostly to be represented by a frame between the absorb queues and the egress queues. In addition, every time one of the packets is sent from one of the absorb queues AQn to one of the egress queues Qn, the amount of queue usage of the egress queues Qn changes, thereby affecting the priority state Qn_URG of each of the egress queues Qn, and also affecting the packet forwarding priority state AQn_URG of each of the absorb queues AQn. Therefore, each of the egress queues always returns the priority state Qn_URG thereof to the absorb queue AQn connected thereto, such that the packet forwarding priority state AQn_URG of each of the absorb queues AQn is always updated. When the absorb scheduler 53 is required to schedule the absorb queues, the absorb scheduler 53 can use the most recent packet forwarding priority states AQn_URG as a selection basis.

It can be observed that, compared to a conventional absorb scheduler, the absorb scheduler 53 is not required to arrange the absorb queues AQ0 and AQ1 with the absorb queue weights, and is not required to schedule the absorb queues AQ0 and AQ1 according to the absorb queue weights. It is possible to schedule the absorb queues AQ0 and AQ1 according to the amount of queue usage of each of the egress queues. Therefore, as shown in FIG. 4, in step S410, the switch 5 can generate the priority state Qn_URG for each of the egress queues of each of the egress ports, and the priority states Qn_URG is used to reflect the imminence of the egress queues Qn corresponding to the priority states Qn_URG are to have no packets to send. Next, in step S430, according to the priority state Qn_URG of each of the egress queues, the absorb scheduler 53 can select one of the absorb queues to send the packets stored therein to the target egress queue of the target egress port.

As mentioned above, since each of the egress queues can return the priority state Qn_URG to one of the absorb queues AQn connected thereto, the method in FIG. 4 may further include step S420, or step S420 may also be omitted. In step S420, according to the priority state Qn_URG of each of the egress queues connection to the switch 5, the switch 5 can determine the packet forwarding priority state AQn_URG of each of the absorb queues, and the packet forwarding priority state AQn_URG is used to reflect the degree of priority state of sending the packets stored in each of the absorb queues AQn corresponding to the priority states AQn_URG. Moreover, as described in step S430, "the absorb scheduler 53 selects one of the absorb queues according to the priority state Qn_URG of each of the egress queues" can refer to the packet forwarding priority state AQn_URG of each of the absorb queues, and the absorb scheduler 53 selects the most urgent one of the absorb queues that needs to send the packets. The details are as described in the foregoing content, and will not be reiterated herein.

Figure 6:
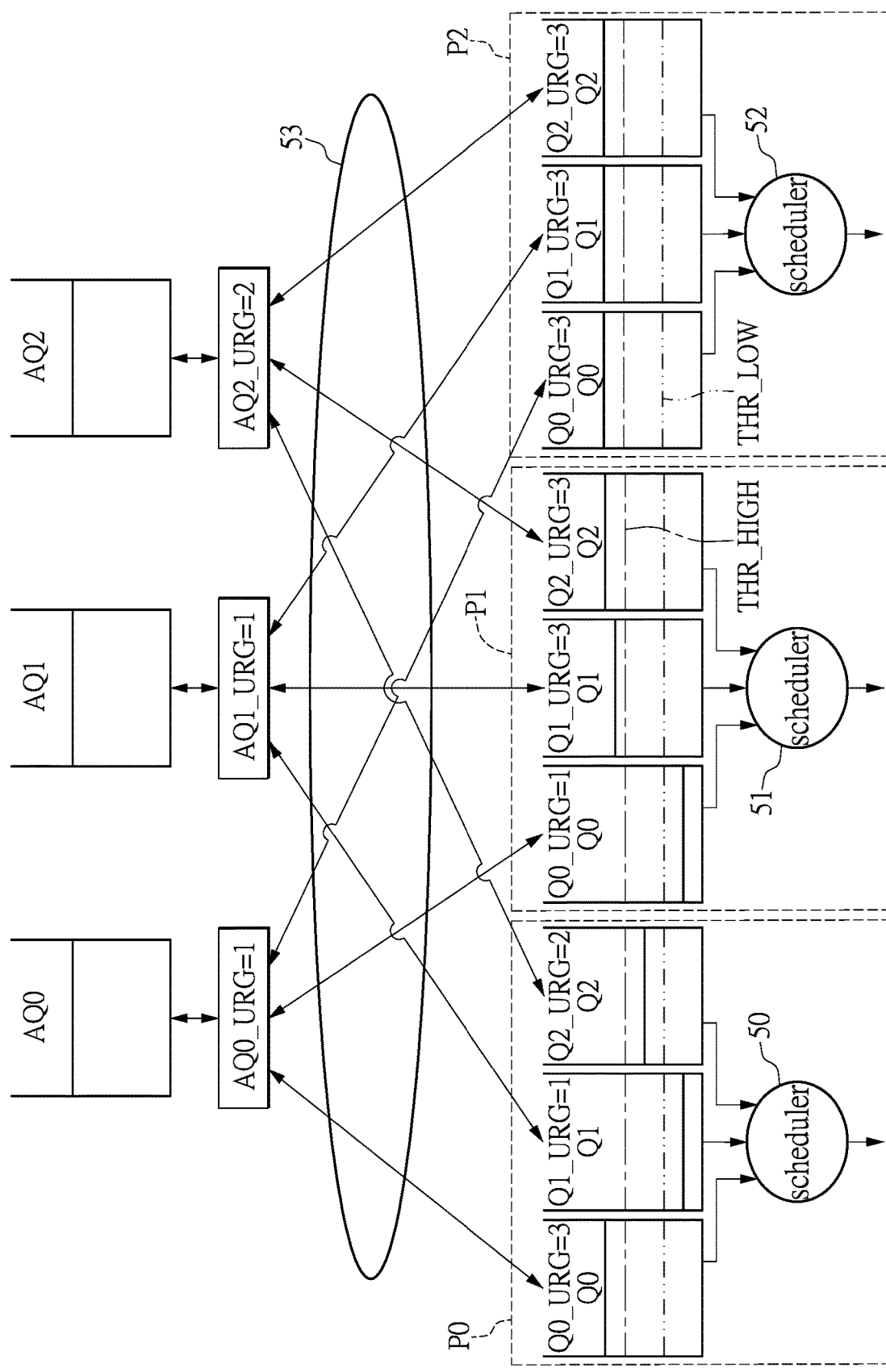
FIG. 6 is a second schematic view of the switch in one embodiment of the present disclosure using the scheduling method as shown in FIG. 4.

On the other hand, when the absorb scheduler 53 is selecting one of the absorb queues, when more than two of the packet forwarding priority states of the absorb queues reflects that the absorb queues corresponding thereto are the most urgent ones of the absorb queues that need to send the packet stored therein, the absorb scheduler selects one of the absorb queues corresponding thereto through round robin scheduling or random scheduling. As exemplified in FIG. 6, and n is changed to 0, 1, or 2. That is to say, each of the egress ports has three egress queues Q0, Q1, and Q2, and the egress queues Q0, Q1, and Q2 of each of the egress ports are connected to the absorb queues AQ0, AQ1, and AQ2, respectively. Therefore, when the packet forwarding priority state AQ0_URG and AQ_URG are both 1, and the packet forwarding priority state AQ2_URG is 2, the absorb scheduler 53 should prioritize and schedule the absorb queues AQ0 and AQ1. Conceptually, the absorb scheduler 53 shown in FIG. 6 can schedule the absorb queues AQ0 and AQ1 in turns, and only schedule the absorb queues AQ0 or AQ1 to send a packet respectively stored therein to the egress queue of the egress port Pm that is required to be sent to each time. However, since the change of the priority states Qn_URG affect the result of selection of the absorb scheduler 53, the absorb scheduler 53 shown in FIG. 6 can also randomly select the absorb queues AQ0 or AQ1, so as to respectively send the packets stored therein to the egress queues Q0 or Q1 of the egress port Pm that is required to be sent to.

From another perspective, when one of the absorb queues is favored and the packets stored therein are continuously sent to a certain one of the egress queues, other ones of the egress queues can be starved to the point that there are no packets to send, thereby causing the egress queue weight to be unbalanced. As exemplified in FIG. 6, the packet forwarding priority states AQ0_URG and AQ1_URG are determined according to the priority states Q0_URG of the egress queue Q0 of the egress port P1 and the priority state Q1_URG of the egress queue Q1 of the egress port P0, respectively. Therefore, when the absorb scheduler 53 prioritizes and schedules the absorb queue AQ0 to send the packets stored therein to the egress queue Q0 of the egress port P1, and the egress queue Q0 of the egress port P1 has a respectively larger weight, or even has a strict priority (SP), the egress queue Q0 of the egress port P1 is always scheduled by the scheduler 51 of the egress port P1, so that it is possible for the packet forwarding priority state AQ0_URG to always be 1. Therefore, the absorb scheduler 53 always schedules the absorb queue AQ0, and has no opportunity to schedule the absorb queue AQ1, such that the egress queue Q1 of the egress port P0 is prone to having no packets to send.

In addition, in this embodiment, the priority state Qn_URG of 1 represents that the current accumulated number of the packets in the corresponding egress queue Qn is less than or equal to the low threshold value THR_LOW, and there are two situations that cause the current accumulated number of the packets in the egress queue Qn to be less than or equal to the low threshold value THR_LOW. The first situation is that the packets accumulated in the egress queue Qn are about to be completely sent, and that the absorb queue AQn is urgently needed to send the packets to the egress queue Qn. The second situation is that no packets has been sent to the egress queue Qn yet, and that the absorb scheduler 53 can suspend the scheduling of the absorb queue AQn. As exemplified in FIG. 7, each of the absorb queues of a central absorb memory 64 can also perform a counting of the packets sent to each of the egress ports, and then determine an empty state value PmQn_EMP_STA of each of the egress queues of each of the egress ports according to a result of the counting.

Figure 7:
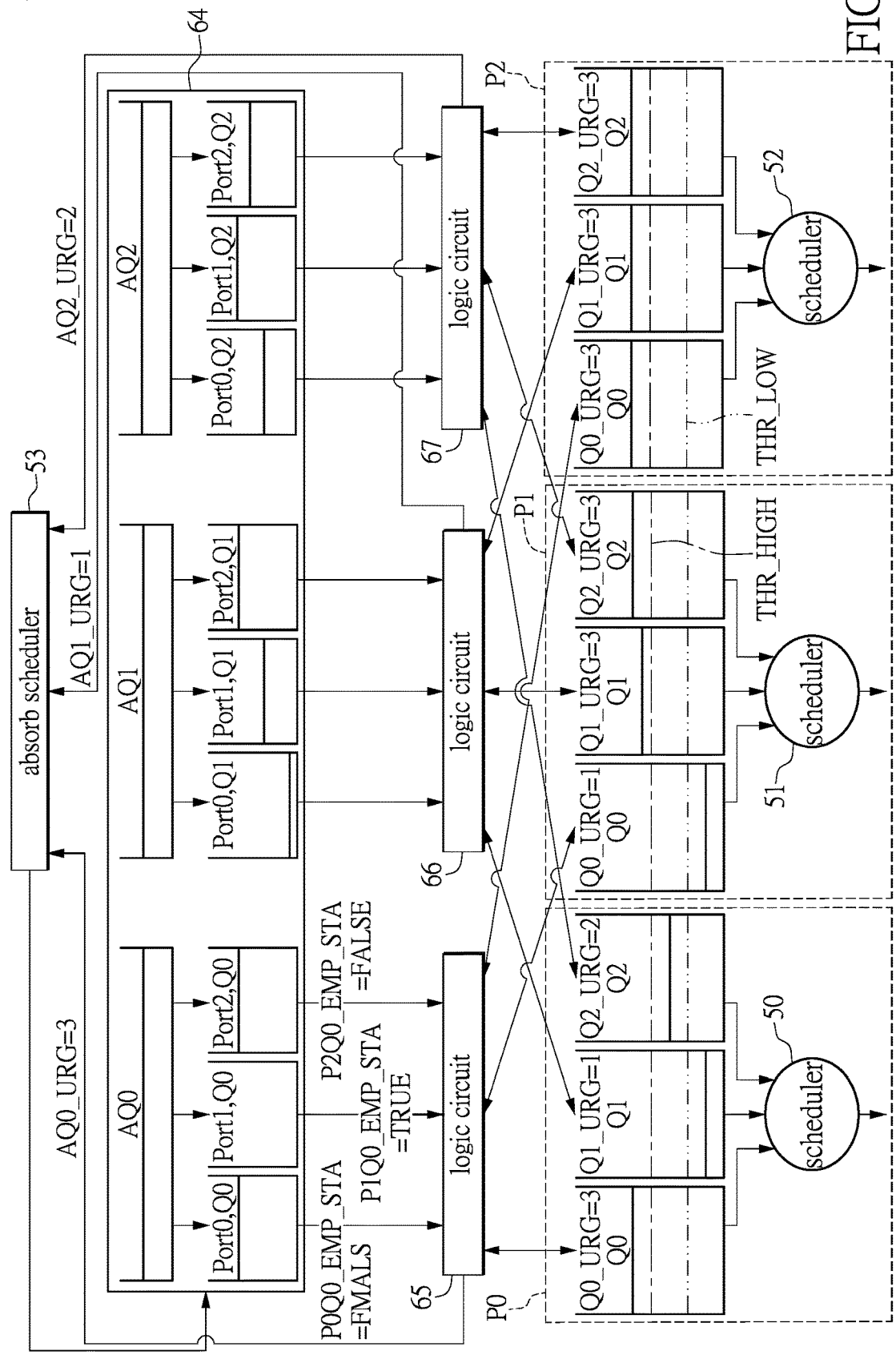
FIG. 7 is a third schematic view of the switch in one embodiment of the present disclosure using the scheduling method as shown in FIG. 4.

For example, when one of the absorb queues AQn counts the packets that are sent to one of the egress ports Pm, and the result of the counting equals to 0, it is determined that the empty state value PmQn_EMP_STA of one of the egress queues Qn of one of the egress ports Pm is true (TRUE) in this embodiment. Conversely, when one of the absorb queue AQn counts the packets that are sent to one of the egress ports Pm, and the result of the counting does not equal to 0, it is determined that the empty state value PmQn_EMP_STA of one of the egress queues Qn of one of the egress ports Pm is false (FALSE) in this embodiment. In other words, the empty state value PmQn_EMP_STA can be used to indicate whether or not no packets are sent to the egress queues Qn of the egress ports Pm. As shown in FIG. 7, the absorb queue AQ0 only sends the packets to the egress ports P0 and P2, and not to the egress port P1. Therefore, empty state values P0Q0_EMP_STA and P2Q0_EMP_STA of the egress queue Q0 of the egress ports P0 and P2 are both FALSE, and an empty state value P1Q0_EMP_STA of the egress queue Q0 of the egress port P1 is TRUE.

In addition, each of the absorb queues in FIG. 7 can further include a logic circuit to receive the empty state value PmQn_EMP_STA and the priority state Qn_URG returned by each of the egress queues of each of the egress ports connected to the corresponding absorb queue AQn, so as to determine the packet forwarding priority state AQn_URG of each of the absorb queues AQn, and the packet forwarding priority state AQn_URG of each of the absorb queues AQn is transmitted to the absorb scheduler 53. In this embodiment, each of the logic circuits uses the empty state value PmQn_EMP_STA to pre-process the priority state Qn_URG of each of the egress queues Qn of each of the egress ports Pm, respectively, so as to prevent the corresponding absorb queue AQn from sending the packets stored therein to each of the egress queues Qn. In other words, each of the logic circuits can adjust the priority state Qn_URG returned by each of the egress queues Qn of each of the egress ports Pm, respectively, according to the empty state value PmQn_EMP_STA.

For example, when the empty state value PmQn_EMP_STA is TRUE, one of the logic circuits can adjust the priority state Qn_URG of the corresponding egress queue Qn of the corresponding egress port Pm to a special value, such as 4, so as to indicate that the corresponding egress queue Qn of the corresponding egress port Pm does not require a service of the absorb queue AQn. As shown in FIG. 7, since the empty state value P1Q0_EMP_STA is TRUE, a logic circuit 65 can adjust the priority state Q0_URG of the egress queue Q0 of the egress port P1 from 1 to 4. Therefore, the priority states Q0_URG returned by the egress queues Q0 of the egress ports P0 and P2 are 3 and 3, respectively, and the adjusted priority state Q0_URG of the egress queue Q0 of the egress port P1 is 4, and the logic circuit 65 can select the lowest priority state Q0_URG as the packet forwarding priority state AQ0 URG of the absorb queue AQ0, i.e., AQ0_URG=3. The details are as described in the foregoing content, and will not be reiterated herein.

Figure 8:
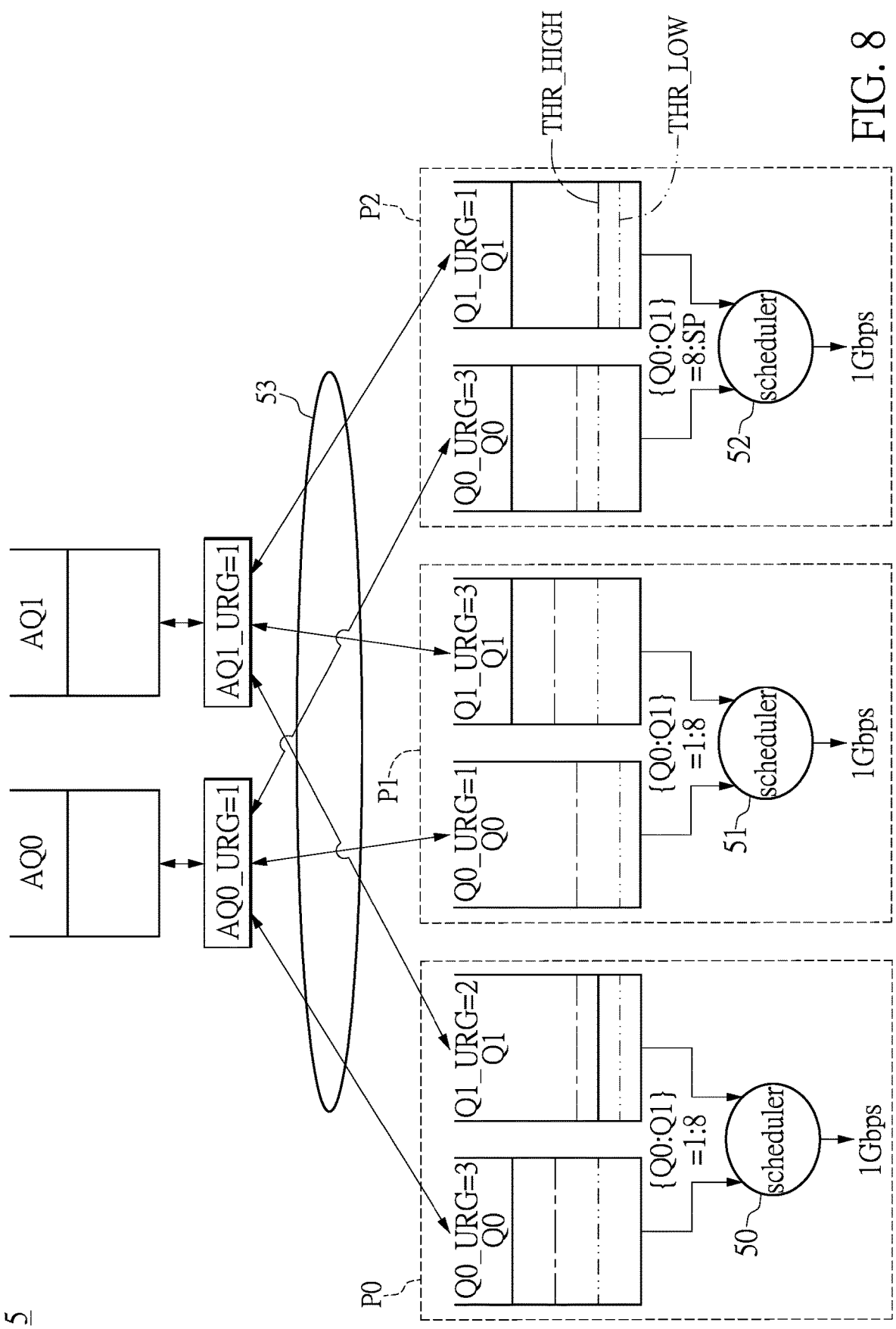
FIG. 8 is a fourth schematic view of the switch in one embodiment of the present disclosure using the scheduling method as shown in FIG. 4.

On the other hand, it can be observed from the foregoing content that the threshold value affects the value of the corresponding priority state Qn_URG. Therefore, in practice, the present disclosure can set the link speed, the rate limit, the egress queue weight, whether or not the egress queue is assigned with SP, and other factors as the basis for arranging the threshold values. As exemplified in FIG. 8, although connection speeds of the egress ports P0, P1 and P2 are all 1 Gbps, the egress queue Q1 of the egress port P2 is given SP to be selected to transmit packets first. Therefore, the egress queue Q1 of the egress port P2 can be expected to not have too many packets accumulated therein, and the threshold value thereof is required to be arranged to be relatively higher, such that the absorb scheduler can schedule more actively to send the packets to the egress queue Q1. For example, the high threshold value THR_HIGH and the low threshold value THR_LOW of the egress queue Q1 of the egress port P2, to truly reflect the needs of the queue having SP.

In addition, when the egress queue weights of the egress queues Q0 and Q1 of the egress port P0 are 1 and 8, respectively, the egress queue Q1 of the egress port P0 is 8 times more likely to be selected to transmit the packets than the egress queue Q0 of the egress port P0. In addition, in order to maintain the packet transmission ratio of 1:8, the switch 5 expects that the egress queue Q1 of the egress port P0 to always have the accumulated packets to be sent out. Therefore, a packet demand of the egress queue Q1 of the egress port P0 is greater than that of the egress queue Q0 of the egress port P0, and the threshold value of the egress queue Q1 of the egress port P0 can be arranged to be higher than that of the egress queue Q0 of the egress port P0, such that the absorb scheduler can schedule the packets to be sent to the egress queue Q1 more actively. All in all, the present disclosure does not limit the specific implementation of arranging the threshold value.

Beneficial Effects of the Embodiment

One of the beneficial effects of the switch and the scheduling method for packet forwarding provided in the embodiment of the present disclosure is that the switch and the scheduling method for packet forwarding are not required to arrange the absorb queue weights for the absorb queues, and not required to schedule the absorb queues according to the absorb queue weights. Instead, the absorb queues can be scheduled according to the amount of queue usage of each of the egress queues in the embodiment of the present disclosure. Therefore, the switch and the scheduling method for packet forwarding of the present disclosure can meet the needs of different egress queues, and provide real-time services to the egress queues requiring the packets, such that the egress queue weight is not unbalanced, and the absorb scheduler can operate more efficiently.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A scheduling method for packet forwarding adapted to a switch, the switch including a plurality of absorb queues, a plurality of egress ports, and an absorb scheduler, each of the egress ports including a plurality of egress queues, and each of the egress queues being connected to one of the absorb queues that are different from one another, the scheduling method comprising:
generating a priority state for each of the egress queues of each of the egress ports, the priority states being used to reflect an imminence that the egress queues corresponding to the priority states are to have no packets to send; and
selecting, by the absorb scheduler, one of the absorb queues to send a packet stored therein to a target egress queue of a target egress port to be sent to, according to the priority state of each of the egress queues,
wherein each of the egress queues returns the priority state of each of the egress queues to one of the absorb queues connected thereto, and the scheduling method further comprises:
determining a packet forwarding priority state of each of the absorb queues according to the priority state of each of the egress queues connected thereto, the packet forwarding priority states being used to reflect a degree of priority state of sending the packets stored in the absorb queues corresponding to the packet forwarding priority states, respectively.

2. The scheduling method according to claim 1, wherein the priority state of each of the egress queues is generated according to a result of a comparison between an amount of queue usage thereof and at least one threshold value.

3. The scheduling method according to claim 1, wherein the priority state of each of the egress queues is generated according to a result of a comparison between an amount of queue usage thereof and a flow rate thereof.

4. The scheduling method according to claim 1, wherein a step of the absorb scheduler selecting one of the absorb queues according to the priority state of each of the egress queues includes:
determining, by the absorb scheduler, one of the absorb queues as one that most urgently needs to send the packet stored therein according to the packet forwarding priority state of each of the absorb queues.

5. The scheduling method according to claim 4, wherein, when two or more of the packet forwarding priority states of the absorb queues reflects that the absorb queues corresponding to the two or more packet forwarding priority states are the absorb queues that most urgently need to send the packet stored therein, the absorb scheduler selects one of the absorb queues corresponding to the two or more packet forwarding priority states through a round robin scheduling or a random scheduling.

6. The scheduling method according to claim 4, wherein each of the absorb queues further performs a counting of the packets that are sent to each of the egress ports, respectively, and determines an empty state value of each of the egress queues of each of the egress ports according to a result of the counting.

7. The scheduling method according to claim 6, wherein the empty state value is used to indicate whether no packet is sent to a corresponding one of the egress queues of each of the egress ports.

8. The scheduling method according to claim 7, further comprising: adjusting the priority state returned by the corresponding one of the egress queues of each of the egress ports according to the empty state value.

9. A switch, comprising:
a plurality of absorb queues;
a plurality of egress ports, each of the egress ports including a plurality of egress queues, and each of the egress queues being connected to one of the absorb queues that are different from one another; wherein the switch generates a priority state for each of the egress queues of each of the egress ports, and the priority states are used to reflect an imminence that the egress queues corresponding to the priority states are to have no packets to send; and
an absorb scheduler selecting one of the absorb queues to send a packet stored therein to a target egress queue of a target egress port to be sent to, according to the priority state of each of the egress queues,
wherein each of the egress queues returns the priority state of each of the egress queues to one of the absorb queues connected thereto, and the switch is further used for:
determining a packet forwarding priority state of each of the absorb queues according to the priority state of each of the egress queues connected thereto, and the packet forwarding priority states being used to reflect a degree of priority state of the absorb queues sending the packets stored therein, respectively.

10. The switch according to claim 9, wherein the priority state of each of the egress queues is generated according to a result of a comparison between an amount of queue usage thereof and at least one threshold value.

11. The switch according to claim 9, wherein the priority state of each of the egress queues is generated according to a result of a comparison between an amount of queue usage thereof and a flow rate thereof.

12. The switch according to claim 9, wherein a step of the absorb scheduler selecting one of the absorb queues according to the priority state of each of the egress queues includes:
determining, by the absorb scheduler, one of the absorb queues as one that most urgently needs to send the packet stored therein according to the packet forwarding priority state of each of the absorb queues.

13. The switch according to claim 12, wherein, when two or more of the packet forwarding priority states of the absorb queues reflects that the absorb queues corresponding to the two or more of the packet forwarding priority states are the absorb queues that most urgently need to send the packet stored therein, the absorb scheduler selects one of the absorb queues corresponding to the two or more of the packet forwarding priority states through a round robin scheduling or a random scheduling.

14. The switch according to claim 12, wherein each of the absorb queues further performs a counting of the packets that are sent to each of the egress ports, respectively, and determines an empty state value of each of the egress queues of each of the egress ports according to a result of the counting.

15. The switch according to claim 14, wherein the empty state value is used to indicate whether no packet is sent to a corresponding one of the egress queues of each of the egress ports.

16. The switch according to claim 15, wherein each of the absorb queues further includes a logic circuit, and the logic circuits adjust the priority state returned by the corresponding one of the egress queues of each of the egress ports according to the empty state value.

* * * * *